(12) United States Patent
Mendel et al.

(10) Patent No.: US 9,274,880 B1
(45) Date of Patent: Mar. 1, 2016

(54) METHODS AND APPARATUS FOR DETECTING AND CORRECTING ERRORS IN HIGH-SPEED SERIAL COMMUNICATIONS SYSTEMS

(71) Applicant: Altera Corporation, San Jose, CA (US)

(72) Inventors: David W. Mendel, Sunnyvale, CA (US); Gregg William Baeckler, San Jose, CA (US)

(73) Assignee: Altera Corporation, San Jose, CA (US)

( * ) Notice: Subject to any disclaimer, the term of this patent is extended or adjusted under 35 U.S.C. 154(b) by 67 days.

(21) Appl. No.: 13/963,791

(22) Filed: Aug. 9, 2013

(51) Int. Cl.
*H03M 13/00* (2006.01)
*G06F 11/10* (2006.01)

(52) U.S. Cl.
CPC ..................................... *G06F 11/10* (2013.01)

(58) Field of Classification Search
CPC ....... H03M 13/19; H03M 13/00; H03M 5/06; G06F 11/1008; G06F 11/1048; G06F 11/1044; H04L 1/0042; H04L 25/4908; H04L 1/0065; H04L 1/0071; H04L 1/0057; H04L 25/03146; H04L 1/0045; H04L 1/0072; H04L 7/048; H04L 1/0061; H04L 2001/0092; H04L 12/00
See application file for complete search history.

(56) References Cited

U.S. PATENT DOCUMENTS

| | | | | |
|---|---|---|---|---|
| 4,117,458 A | * | 9/1978 | Burghard et al. | 714/753 |
| 4,271,521 A | * | 6/1981 | Mahmood | 714/802 |
| 4,365,332 A | * | 12/1982 | Rice | 714/746 |
| 4,736,376 A | * | 4/1988 | Stiffler | 714/785 |
| 5,835,511 A | * | 11/1998 | Christie | 714/802 |
| 6,301,680 B1 | * | 10/2001 | Cypher | 714/746 |
| 6,738,935 B1 | * | 5/2004 | Kimmitt | 714/701 |
| 7,426,678 B1 | * | 9/2008 | Cory et al. | 714/785 |
| 7,865,805 B1 | * | 1/2011 | Gallagher et al. | 714/773 |
| 8,301,912 B2 | | 10/2012 | Lin et al. | |
| 8,352,837 B1 | * | 1/2013 | Zhu et al. | 714/776 |
| 8,560,927 B1 | * | 10/2013 | Pagiamtzis et al. | 714/785 |
| 2003/0110434 A1 | | 6/2003 | Amrutur et al. | |
| 2006/0074960 A1 | * | 4/2006 | Goldschmidt et al. | 707/102 |
| 2007/0168835 A1 | | 7/2007 | Amrutur et al. | |
| 2007/0214403 A1 | * | 9/2007 | Longwell et al. | 714/800 |
| 2007/0260965 A1 | * | 11/2007 | Schmidt et al. | 714/799 |
| 2008/0098277 A1 | * | 4/2008 | Hazelzet | 714/753 |
| 2009/0199070 A1 | * | 8/2009 | Haymes et al. | 714/757 |
| 2012/0297271 A1 | | 11/2012 | Sommer et al. | |
| 2014/0269738 A1 | * | 9/2014 | Pierson | 370/400 |

* cited by examiner

*Primary Examiner* — Guerrier Merant

(57) ABSTRACT

An error detection and correction circuit is provided that reduces the number of errors in a data signal sent over a high-speed serial link with little area overhead and without deteriorating the latency of the data transmission. An error detection and correction circuit on the transmit side may compute parity bits for each data packet of N bit-wise interleaved data packets and insert these parity bits into a serial data stream. A transmitter may send the serial data stream with the data packets and the parity bits over a high-speed serial link to a receiver. An error detection and correction circuit on the receive side may locate and correct single-bit errors and detect double-bit errors in each packet of the data signal. Thus, the error correction circuit may correct up to N errors in the N bit-wise interleaved data packets.

20 Claims, 10 Drawing Sheets

METHODS AND APPARATUS FOR DETECTING AND CORRECTING ERRORS IN HIGH-SPEED SERIAL COMMUNICATIONS SYSTEMS

BACKGROUND

This invention relates to error detection and correction circuitry and, more particularly, to the use of error detection and correction circuitry in data communications over high-speed serial communication links.

Integrated circuits communicate with one another via communication paths sometimes also known as input-output (I/O) buses. An increasingly important communications type is data communication in the form of serial data streams over serial communication links. Serial communication can be faster than parallel communications and typically uses fewer pins.

It can be challenging to handle serial data streams at high data rates (e.g., at data rates above several Gbps) especially if communication links are subject to channel noise which may result in the introduction of errors during the transmission of the serial data stream from a transmitter over the communication link to a receiver. As a result, serial links often use error checking schemes such as the cyclic redundancy checking (CRC) error checking scheme or the Reed Solomon error correction scheme.

The implementation of error checking schemes typically involves a significant increase in circuit size and latency. Consequently, it is desirable to provide improved mechanisms for implementing error correction.

SUMMARY

In accordance with certain aspects of the present invention, a transmitter that is coupled to a high-speed serial link may send a data signal over the high-speed serial link to an interface circuit in a receiver. The data signal may include multiple groups of bits, and each group of bits may include data bits and parity bits. Circuitry for reducing errors in the data signal may receive the data signal from the interface circuit. The circuitry for reducing errors in the data signal may further include an error correction circuit that receives the data signal from the interface circuit and that locates and corrects only single-bit errors in each group of bits in the data signal. The error correction circuit may further detect double-bit errors in each group of bits in the data signal.

It is appreciated that the present invention can be implemented in numerous ways, such as a process, an apparatus, a system, a device, or a method executed on a processing machine. Several inventive embodiments of the present invention are described below.

In certain embodiments, the error correction circuit may further include a parity generator circuit that receives a given group of bits of the data signal. The parity generator circuit may compute additional parity bits based on the data bits of the given group of bits. The error correction circuit may further include a parity check circuit that receives the parity bits in the given group of bits and the additional parity bits from the parity generator circuit. The parity check circuit may compare the parity bits in the given group of bits and the additional parity bits and output a bit position for a detected single-bit error based on the comparison.

If desired, the error correction circuit may further include correction circuitry that receives the bit position of the single-bit error from the parity check circuit and inverts data at the bit position.

Further features of the invention, its nature and various advantages, will be more apparent from the accompanying drawings and the following detailed description of the preferred embodiments.

DETAILED DESCRIPTION

Embodiments of the present invention relate to error detection and correction circuitry and, more particularly, to the use of error detection and correction circuitry in data communications over high-speed serial communication links.

Electronic devices such as integrated circuits increasingly communicate with one another by sending serial data streams over high-speed serial communication links. Channel noise and other factors often lead to the introduction of errors during the transmission of the serial data stream. As a result, serial links often use error checking and error correction schemes to reduce the number of errors in the transmitted data signal. Commonly used error correction techniques include the cyclic redundancy checking (CRC) error checking scheme and the Reed Solomon error correction scheme.

The implementation of such error checking and error correction schemes typically involves an increase in circuit area and latency which may both be significant. Consequently, it is desirable to provide improved techniques for performing error correction which use less circuit area and which require less latency.

It will be obvious to one skilled in the art, that the present exemplary embodiments may be practiced without some or all of these specific details. In other instances, well-known operations have not been described in detail in order not to unnecessarily obscure the present embodiments.

Figure 1:
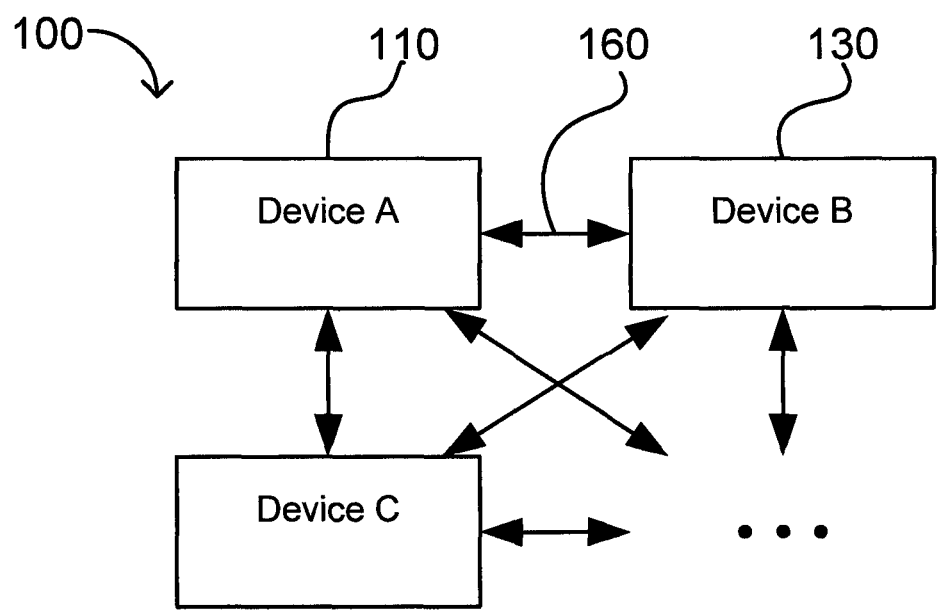
FIG. 1 is a diagram of illustrative interconnected electronic devices in accordance with an embodiment of the present invention.

An illustrative system 100 of interconnected electronic devices is shown in FIG. 1. The system of interconnected electronic devices may have multiple electronic devices such as device A (shown as 110 in FIG. 1), device B (shown as 130 in FIG. 1), device C, and interconnection resources 160. The electronic devices may be any suitable type of electronic device that communicates with other electronic devices. Examples for such electronic devices include basic electronic components and circuits such as analog circuits, digital circuits, mixed-signal circuits, and integrated circuits that are interconnected on a printed-circuit board (PCB). Examples of such electronic devices also include complex electronic systems such as network routers and cell phone base stations or parts thereof that communicate with each other over wired or wireless networks.

Interconnection resources 160 such as conductive lines and busses, optical interconnect infrastructure, or wired and wireless networks with optional intermediate switches may be used to send signals from one electronic device to another electronic device or to broadcast information from one electronic device to multiple other electronic devices.

Figure 2:
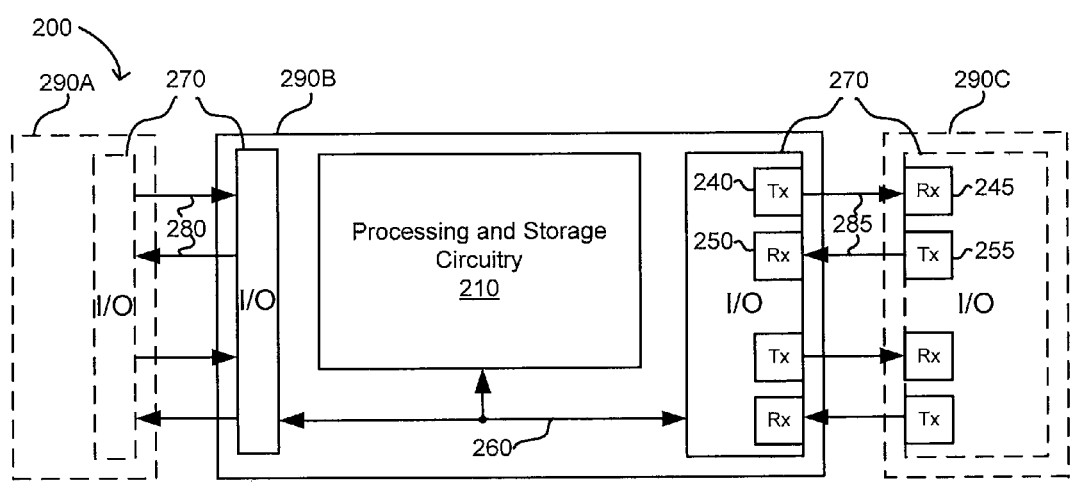
FIG. 2 is a diagram of illustrative interconnected integrated circuits in accordance with an embodiment of the present invention.

FIG. 2 shows an illustrative embodiment of a system 200 of electronic devices 290. In the example of FIG. 2, electronic devices 290 are integrated circuits. Exemplary integrated circuits (ICs) include programmable array logic (PAL), programmable logic arrays (PLAs), field programmable logic arrays (FPGAs), electrically programmable integrated circuits (EPLDs), electrically erasable programmable integrated circuits (EEPLDs), logic cell arrays (LCAs), field programmable gate arrays (FPGAs), application specific standard products (ASSPs), application specific integrated circuits (ASICs), and microprocessors just to name a few. Integrated circuits 290A, 290B, and 290C may be assembled in different ways. For example, integrated circuits 290 may be in different packages, in the same package, stacked with wirebond connections, or assembled using through-silicon-vias (TSV), to name a few.

Integrated circuits 290 may include processing and storage circuitry 210 such as random-access memory (RAM), first-in first-out (FIFO) circuitry, stack or last-in first-out (LIFO) circuitry, read-only memory (ROM), or other memory elements, embedded microprocessors, digital signal processors (DSP), microcontrollers, or other processing circuitry, and interconnection resources 260 such as conductive lines and busses. Interconnection resources 260 may be used to send signals from one component to another component or to broadcast signals from one component to one or more other components.

For example, integrated circuit 290B may include input/output circuitry 270 which may include parallel input/output circuitry, differential input/output circuitry, serial data transceiver circuitry having a serial transmitter circuit such as transmitter circuit 240 and a serial receiver circuit such as receiver circuit 250, or any other desired input/output circuitry. Input/output circuitry 270 may transmit and receive signals over interconnection resources 280 (e.g., when communicating with other devices using parallel input/output circuitry) or over serial communication links such as serial communication links 285 when communicating with other devices using serial data transceiver circuitry.

For example, transmitter 240 in input/output circuitry 270 of integrated circuit 290B may transmit serialized data signals at a given transmission rate as a data stream over serial communication link 285 to integrated circuit 290C where the serial data is received by receiver circuit 245. During transmission over serial communication link 285, noise and other impairments may corrupt the transmitted data signals thereby introducing errors into the data stream. The errors may occur randomly and with a certain probability or the errors may occur in bursts (i.e., multiple errors occur during a short period of time).

Figure 3:
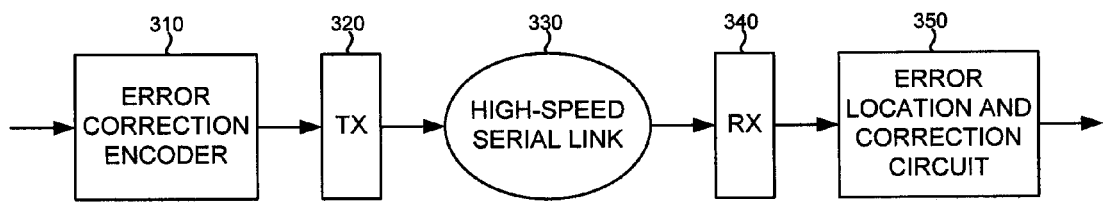
FIG. 3 is a diagram of an illustrative serial communications link with error correction circuitry in accordance with an embodiment of the present invention.

The number of errors in the received data signals may be reduced using error detection and correction circuitry. FIG. 3 shows an illustrative diagram of a serial communications link with error detection and correction circuitry in accordance with an embodiment of the present invention.

An error correction encoder such as error correction encoder 310 may receive a data signal and encode the received data signal by generating additional information which may be inserted into the data stream. Examples of additional information that may be generated and inserted into the data stream are parity bits, cyclic redundancy check (CRC) bits, or checksum bits, to name a few.

A parity bit indicates whether the number of bits in a data word with the value logic "1" is odd or even. A parity bit may either indicate even parity or odd parity. For even parity, the parity bit has the value logic "1" if the number of bits in the data word with the value logic "1" is odd and the value logic "0" if the number of bits in the data word with the value logic "1" is either zero or even. In the case of odd parity, the parity bit has the value logic "0" if the number of bits in the data word with the value logic "1" is odd and the value logic "1" if the number of bits in the data word with the value logic "1" is either zero or even.

Parity bits may be used for error detection by generating a parity bit for a data word before transmission and after reception and comparing the two parity bits. For example, for even parity, a parity bit before transmission may have the value logic "0" if a data word contains an even number of bits with the value logic "1". Upon reception, a newly computed parity bit may have the value logic "1" if the data word now contains an odd number of bits with the value logic "1". A difference in parity bits may indicate that an odd number of bits of the transmitted data word has been corrupted.

Parity bits checking for even parity may be generated using logic exclusive OR (XOR) gates. Parity bits checking for odd parity may be generated using XOR gates followed by an inverter. However, parity bits may not detect when an even number of errors occur in the transmitted data word. For example, a parity bit computed for a received data word has the same value as the parity bit computed before transmission of the data word if two bits of the data word change from logic "0" to logic "1". Furthermore, single parity bits cannot correct errors, because the position of the corrupted bit within the data word is unknown. However, the use of multiple parity bits arranged such that different corrupted bits within a data word produce different error results enables the detection of the position of a corrupted bit and thus enables error correction. Hamming code is one such example of arranging parity bits such that single-bit error correction is enabled.

Hamming codes can detect and correct only one bit errors in a given data word. This is sometimes also referred to as single-bit error correction. Hamming codes allow for single-bit error correction by overlapping parity bits such that one parity bit also checks another parity bit in addition to the bits in the data word. Thus, n parity bits can encode $2^n-1$ total bits. Subtracting the n parity bits from the $2^n-1$ total bits leaves $2^n-n-1$ bits that may be used by bits from the data signal.

For example, n=5 parity bits can encode 31 total bits, leaving 26 bits for the data word. Similarly, n=4 parity bits can encode 15 total bits, leaving 11 bits for the data word. Thus, encoding a 32-bit data word requires six parity bits, and encoding a 16-bit data word requires five parity bits. An embodiment of a parity bit generation circuit for a 16-bit data word that enables single-bit error correction is shown in FIG. 4A.

Figure 4A:
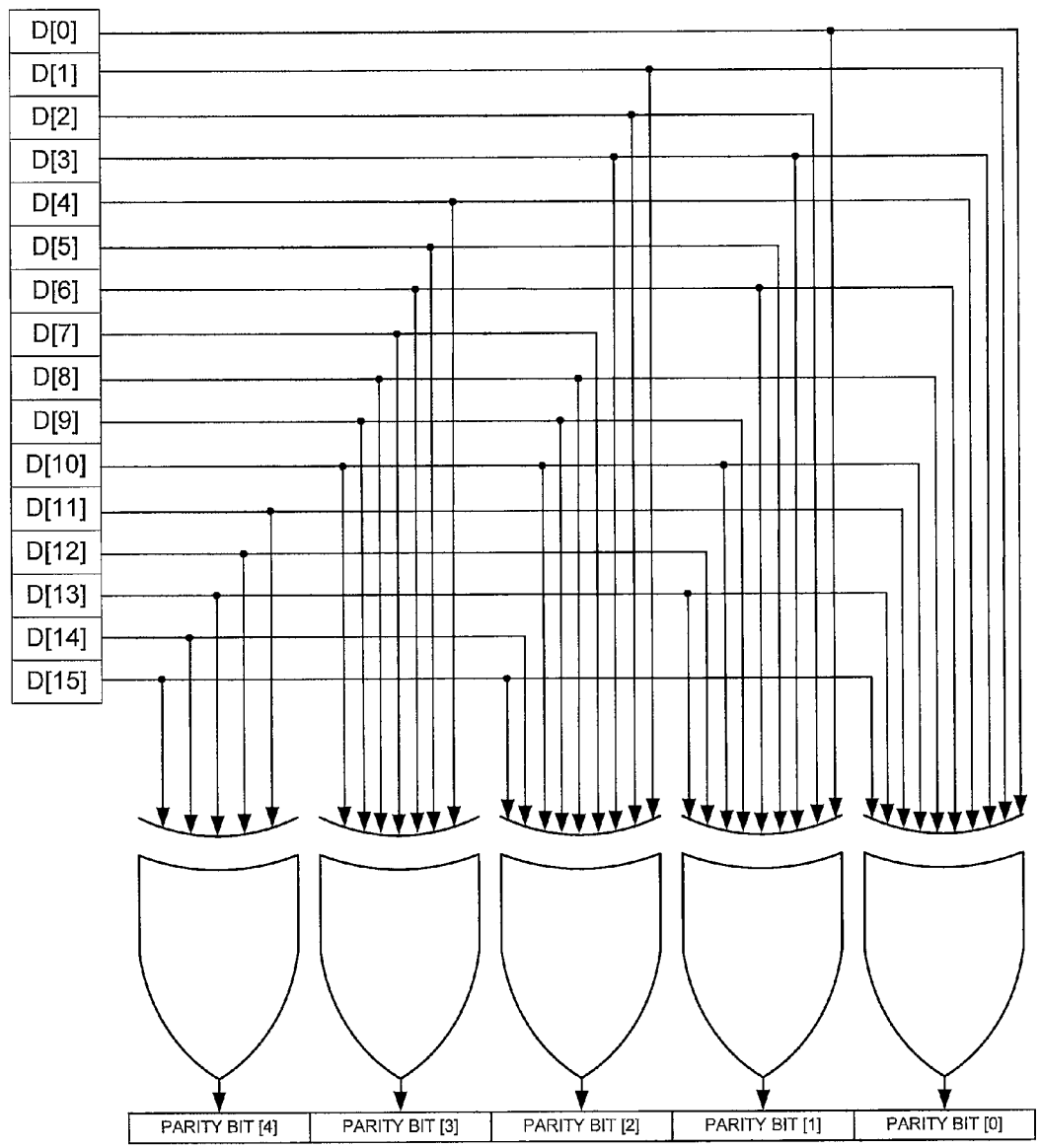
FIG. 4A is a diagram of illustrative circuitry for generating parity bits in accordance with an embodiment of the invention.

The parity bit generation circuit of FIG. 4A generates five parity bits (e.g., parity bit [0] to parity bit [4]) to encode a data word D having 16-bits of data (e.g., D[0] to D[15]). Each parity bit may be generated by XOR circuitry and check for even parity. The parity bit generation is arranged such that each bit of data is checked by at least two parity bits, whereby every data bit is verified by a different subset of parity bits.

For example, data bit D[0] is verified by parity bits [0] and [1] only. No other data bit is verified only by parity bits [0] and [1]. For example, data bits D[3], D[6], D[10], and D[13] are also verified by parity bits [0] and [1]. However, all of these data bits are verified by additional parity bits. D[3] is additionally verified by parity bit [2], D[6] by parity bit [3], D[10] by parity bits [2] and [3], and D[13] by parity bit [4]. Similarly, all other data bits of data word D may be verified by a subset of at least two distinct parity bits. In other words, any single data bit corruption during transmission has the effect that at least two parity bits are different on the receive side. A difference in a single parity bit means that the parity bit itself has been corrupted during transmission.

Error correction encoder 310 of FIG. 3 may generate parity bits for data words in an incoming data stream using a parity bit generation circuit such as the parity bit generation circuit in FIG. 4A. The generated parity bits may be inserted into the data stream and transmitted by transmitter 320 over high-speed serial link 330 to receiver 340. An error location and correction circuit such as error location and correction circuit 350 may perform error correction on the received data stream.

For example, error location and correction circuit 350 may generate parity bits for the received data words using a parity bit generation circuit such as the parity bit generation circuit of FIG. 4A. Error location and correction circuit 350 may further compare the parity bits generated by error correction encoder 310 with the parity bits generated by error location and correction circuit 350. A difference in parity bits may indicate that the data stream was corrupted during transmission over high-speed serial link 330, and the use of a parity bit generation circuit such as the parity bit generation circuit of FIG. 4A allows for single-bit error correction in a given data word.

As an example, consider the corruption of a single data bit during transmission over a high-speed serial link such as high-speed serial link 330 of FIG. 3. Consider further that error correction encoder 310 generates received parity bits and error location and correction circuit 350 generates additional parity bits, both using a parity bit generator circuit as in FIG. 4A.

In the event that two or more parity bits are different between the received and additional parity bits, the location of the corrupted data bit may be determined from the error signature (i.e., from the difference in parity bits). For example, if parity bits [1] and [4] are different, then data bit D[12] has been corrupted. If parity bits [2] and [4] are different, then data bit D[14] has been corrupted. In the event that a single parity bit is different between the received and additional parity bits, then the parity bit itself was corrupted during transmission. Once the location of a single-bit error has been determined, the error may be corrected by inverting the bit at the error location.

The error correction encoder may be further enhanced to include double-bit error detection. For this purpose, an overall parity bit may be added to the data stream. This overall parity bit may check the parity of all bits of the data word. For example, the corruption of two bits of the data word during transmission over a high-speed serial link may lead to a difference between the received and additional parity bits. However, the overall parity bit will be the same thereby indicating that an even number of data bits have been corrupted.

Figure 4B:
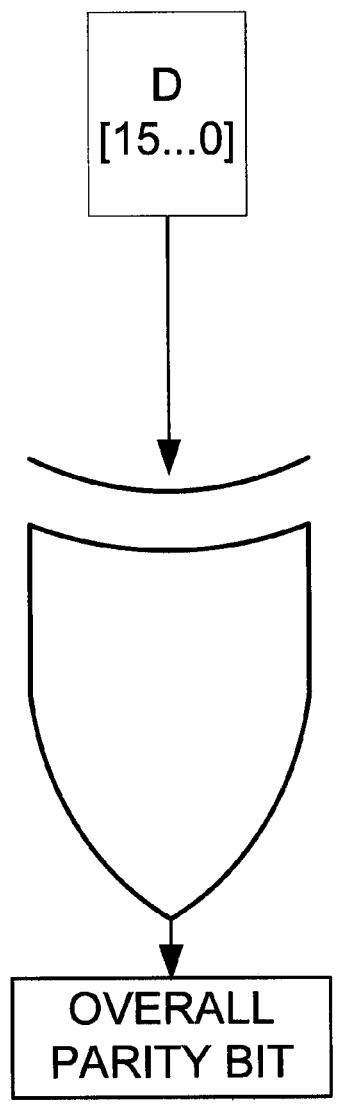
FIG. 4B is a diagram of illustrative circuitry for generating an overall parity bit in accordance with an embodiment of the invention.

An embodiment of a circuit that generates the overall parity bit is shown in FIG. 4B. Such a circuit may perform a logic exclusive OR (XOR) operation between the 16 bits of data word D. The circuit shown in FIG. 4B checks even parity. An additional inverter may invert the overall parity bit in which case the circuit checks odd parity.

Figure 5:
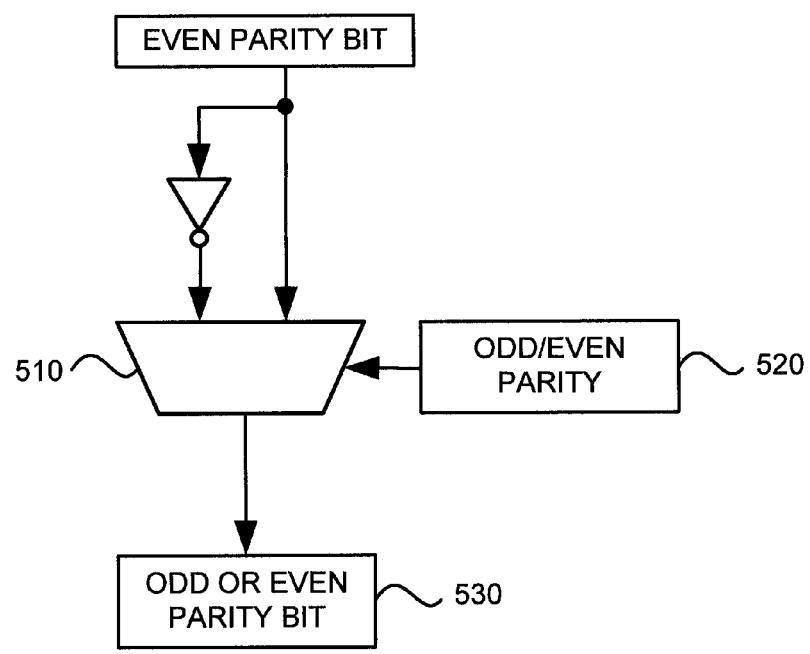
FIG. 5 is a diagram of illustrative circuitry for generating an odd or an even parity bit in accordance with an embodiment of the present invention.

An embodiment of a circuit that may selectively generate either an odd or an even parity bit is shown in FIG. 5. Consider the scenario in which an even parity bit has been generated (e.g., using XOR circuitry). The inverse of the even parity bit is an odd parity bit. Thus by feeding an even and an odd parity bit to a multiplexer such as multiplexer 510 and having odd/even parity 520 select between the odd and even parity bit enables the generation of either an odd or even parity bit 530. Alternatively, each logic exclusive OR (XOR) operation that generates a parity bit as shown in FIGS. 4A and 4B may receive one extra bit such as odd/even parity select signal 520 of FIG. 5, thereby directly generating the desired odd or even parity bit.

Odd/even parity 520 may be configurable and implemented in configuration memory. Odd/even parity 520 may be statically controlled by a user. Odd/even parity 520 may also select dynamically between generating odd and even parity bits. For example, odd/even parity 520 may be directed to make a selection based on the DC balance of the data stream. DC balance refers to the balance between the number of bits that are logic "1" and the number of bits that are logic "0". It may be desirable to submit a data stream with a number of bits that are logic "0" which is as close as possible to the number of bits that are logic "1".

For example, the generated parity bits may contain more parity bits that are logic "1" when checking for even parity while the data word has also more bits that are logic "1" than logic "0". In this case, it may be desirable to generate parity bits that check for odd parity because odd parity bits would have more bits that are logic "0". Thus, the DC balance may improve after insertion of odd parity bits into the data stream.

Error correction encoder 310 and error location and correction circuit 350 of FIG. 3 may support even parity bits as well as odd parity bits. However, it is important for the generation of a correct error signature that error correction encoder 310 and error location and correction circuit 350 both check for the same parity.

Figure 6:
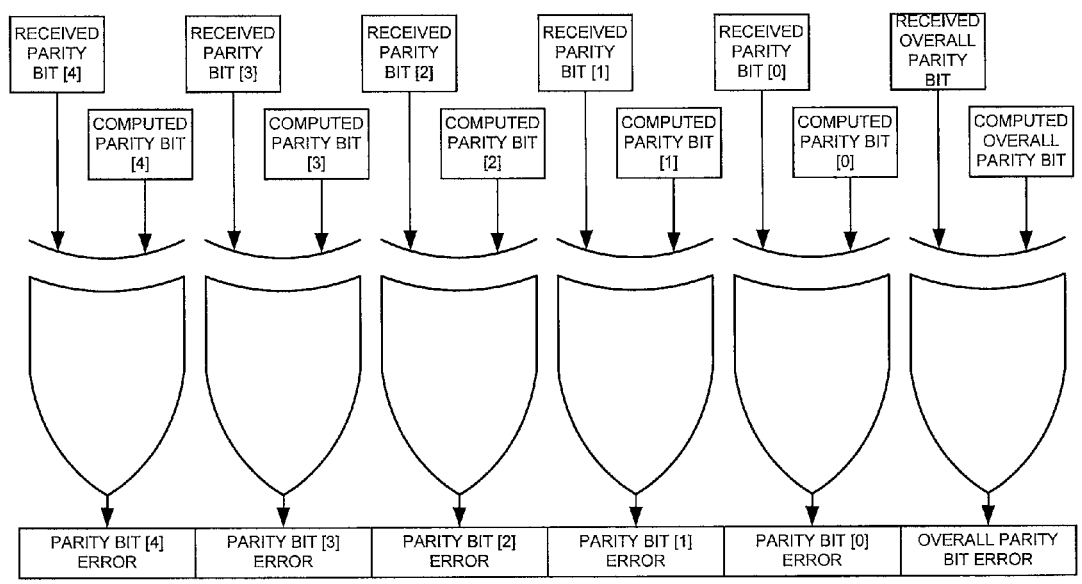
FIG. 6 is a diagram of an illustrative error detection circuit in accordance with an embodiment of the present invention.

An embodiment of an illustrative circuit that generates such an error signature is shown in FIG. 6. The circuit in FIG. 6 receives the received parity bits (i.e., the parity bits generated on the transmit side) and the computed parity bits (i.e., the parity bits generated on the receive side) and performs pair-wise logic exclusive OR operations. The error signature is logic "0" and no error was detected if all received and computed parity bits are identical. A non-zero error signature indicates a difference in at least one received and computed parity bit and thus at least one corrupted bit within the received data stream.

As an example, the error signature may be non-zero but the overall parity bit error may be logic "0". In this example, an even number of bits of the data word may have been corrupted and error correction may not be attempted. However, a request for retransmission may be made by sending a corresponding request from the receiver back to the transmitter.

In another example, the error signature may be non-zero and the overall parity bit error may be logic "1". In this example, an odd number of bits of the data word may have been corrupted and error correction may be attempted based on the error location indicated by the error signature. Optionally, a new set of parity bits may be generated after the error has been corrected, and a new error signature may be computed based on the received parity bits and the new set of parity bits. The new error signature may be zero if a single-bit in the data word had been corrupted and the single-bit error located and fixed. However, the error signature may still be non-zero because three or more bits had originally been corrupted. In this case, the receiver may send a request for retransmission to the transmitter.

Figure 7A:
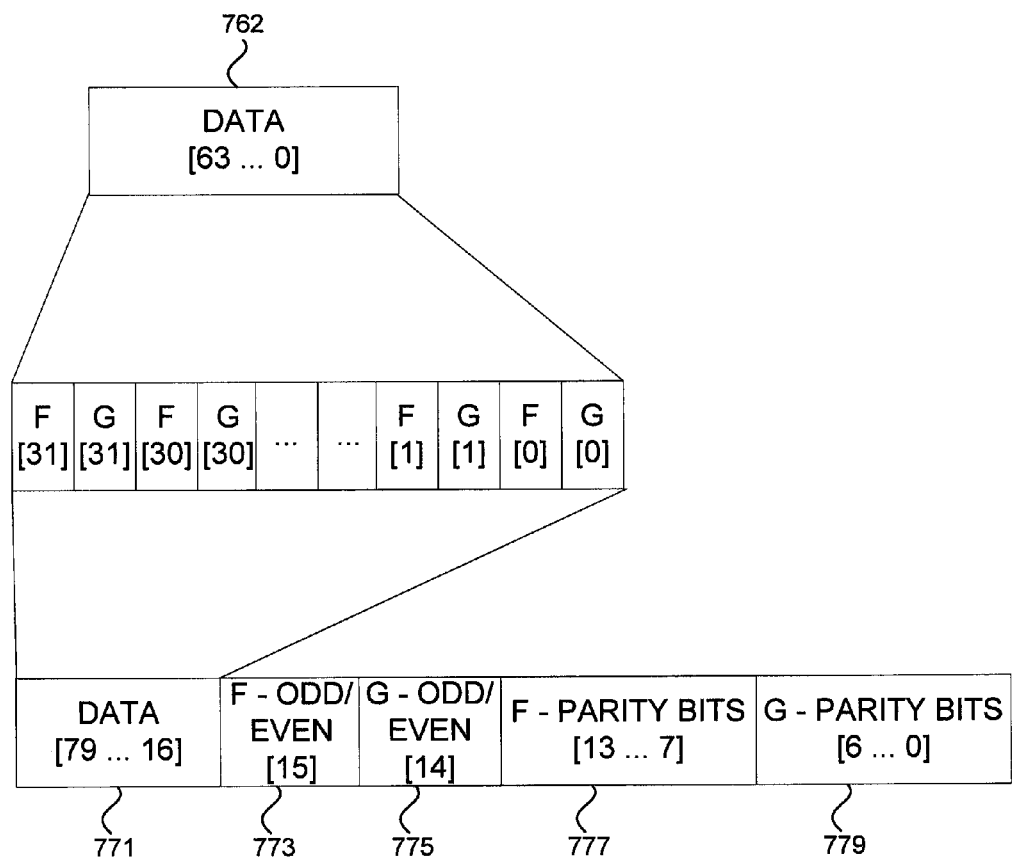
FIG. 7A is a diagram of illustrative bit-wise interleaved data packets with the respective parity bits for each packet in accordance with an embodiment of the invention.

Such burst errors, where multiple errors occur within one data word or within a small number of contiguous data words, may be corrected by bit-wise interleaving those data words. An embodiment of two data words that have been bit-wise interleaved is shown in FIG. 7A.

For example, an interleaver circuit may bit-wise interleave two 32-bit data words such as data words F and G (e.g., using a round-robin approach) to form a 64-bit data word such as data word 762. A parity bit generator circuit such as the parity bit generator circuit of FIG. 4A may generate a separate set of parity bits for each of the two 32-bit data words F and G. Each of the two 32-bit data words F and G requires six parity bits for single-bit error correction and a seventh overall parity bit to allow for double-bit error detection. Thus, the parity bit generator circuit may generate seven parity bits for data word F (e.g., F-parity bits 777 in FIG. 7A) and seven parity bits for data word G (e.g., G-parity bits 779 in FIG. 7A).

The parity bit generator circuit may check for odd or for even parity (e.g., to improve DC balance as discussed above). Since the error checking encoder and the error location and correction circuit must both check for the same parity, an additional bit such as bit 773 for data word F and bit 775 for data word G may be inserted by the error checking encoder to indicate the parity for which the error location and correction circuit needs to check.

Upon receipt of data word 771 together with parity bits 777 and 779, an error location and correction circuit such as error location and correction circuit 350 of FIG. 3 may locate and correct single-bit errors and detect double-bit errors for each data word F and G in isolation. Therefore, the error location and correction circuit may correct any single-bit error in data word 771. In addition, the error location and correction circuit may also correct adjacent double-bit errors in data word 771 or any other two-bit error in data word 771 as long as one bit of the two-bit error is located in a position used by data word F and the other bit of the two-bit error is located in a position used by data word G.

Error location and correction circuit may also detect any double-bit error in data word 771. In addition, the error location and correction circuit may also detect a four-bit error in data word 771 (e.g., if no more than two errors occur in positions used by data word F and no more than two errors occur in positions used by data word G).

In the event of a three-bit error in data word 771, the error location and correction circuit may locate and correct one of the three bits and detect that two more bits have been corrupted.

Data words need not be bit-wise interleaved. Data words may be interleaved in any way. For example, data words may be interleaved in pairs of bits or triplets of bits. In alternative embodiments, data words may be interleaved irregularly (e.g., a pair of bits from each data word, followed by a single bit from each data word, followed by a triplet of bits from each data word, etc.).

A bigger number of data words may be interleaved as well. For example, three, four, five, or 32 data words may be interleaved, to name a few. Each additional data word in the above example requires the generation and insertion of corresponding parity bits into the data stream. Thus, a data packet increases by the number of bits in the data word and the corresponding parity bits for each additionally interleaved data word in the data packet.

The choice of the number of interleaved data words in a data packet may depend on whether random errors or burst errors are more likely to occur in a high-speed serial link. For example, the error correction circuitry may interleave a bigger number of data words in a data packet if burst errors were more likely to occur, and the error correction circuitry may not interleave any data words if random errors were more likely to occur.

In an alternative embodiment, the error correction circuitry may be configurable as to the number bits in a data word. For example, the error correction circuitry may be configured to generate parity bits for data words containing only a small number of bits. Thereby, the error correction circuitry may be able to eliminate all errors even at a high bit error rate and require only a relatively small circuit area for doing so in exchange for a significant overhead in parity bits in the transmitted data packet. In another example, the error correction circuit may reduce the overhead in parity bits in the transmitted data packet at the expense of an increase in circuit area and a decrease in error correction coverage.

Thus, the user may make a trade-off between smaller error correction encoder and error location and correction circuit and support of a higher bit error rate in exchange for an increase in overhead in the transmitted data packets.

For example, an error correction scheme targeting single-bit error correction for a four-bit data word may use three parity bits plus an overall parity bit. Thus, each data packet may consist of eight bits with only 50% of these bits being used for the data word (i.e., the data packet has 50% overhead). The overall parity bit may be generated with a four-input XOR gate, while the three remaining parity bits may be generated with a three-input XOR gate each. The error signature generation circuit requires only four two-input XOR gates and the error correction circuitry does not have much area overhead either. Since this circuitry allows for single-bit error correction in any eight-bit data packet, a data stream with a bit error rate of up to 12.5% may be supported in the sense that all errors may be fixed for a given error distribution.

As another example, an error correction scheme targeting single-bit error correction for a 120-bit data word may use seven parity bits plus an overall parity bit. Thus, each data packet may consist of 128 bits with 93.75% of these bits being used for the data word (i.e., the data packet has 6.25% overhead). The overall parity bit may be generated with a 120-input XOR gate, while the seven remaining parity bits may be generated with a 61-input XOR gate each. The error signature generation circuit requires eight two-input XOR gates and the error correction circuitry has more area overhead than the four-bit data word solution presented above. Since this circuitry allows for single-bit error correction in any 128-bit data packet, only a data transmission with a bit error rate of about 0.78% may be supported.

Figure 7B:
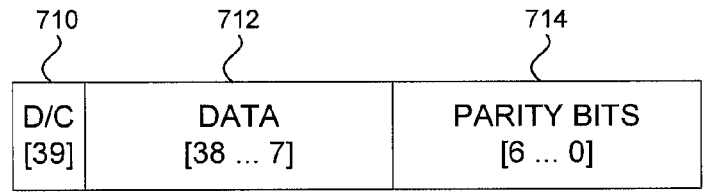
FIG. 7B is a diagram of an illustrative arrangement of data packets with parity bits and additional bits in accordance with an embodiment of the invention.
Figure 7B:
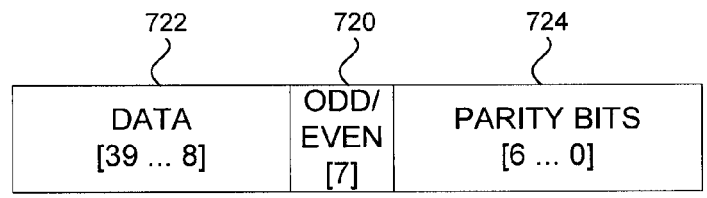
Figure 7B:
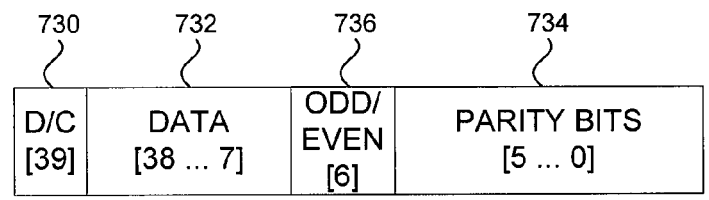
Figure 7B:
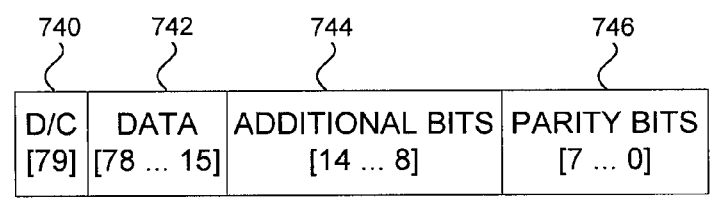
Figure 7B:
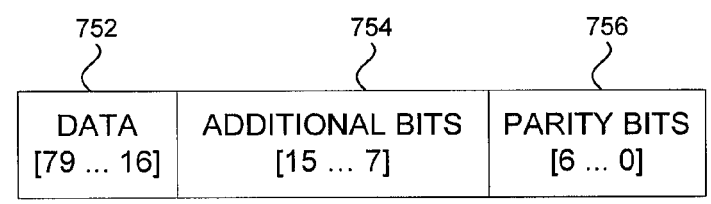

A high-speed serial link may also be configured to transmit a data stream in which each data packet has a fixed number of bits and each data word within that data packet a fixed number of bits as well. For example, each data packet may contain 40 bits and each data word 32 bits leaving 8 bits in each data packet for error checking and other purposes. An embodiment of the error checking circuitry may use six parity bits for single-bit error correction and an additional overall parity bit to allow for double-bit error correction leaving one bit for other purposes. Such an arrangement of bits in a data packet is shown in FIG. 7B.

A data packet may contain a 32-bit word 712, seven parity bits 714 to allow for single-bit error correction and double-bit error detection, and an additional bit 710 which may indicate whether the word in the data packet includes a control word or a data word.

A control word may be any command that may be used by the receiver for a pre-defined purpose. As an example, a 100-Gigabit Ethernet connection may be implemented using four 25 Gbps serial communication links in parallel, each serial communication link handling one fourth of the data traffic. The four serial communication links may require different delays for transmitting packets from the transmitter to the receiver. Control words such as comma symbols may be added to each of the four data streams at regular intervals before transmission. These comma symbols may then be used by the receivers to re-align the data streams received over the four different serial communication links.

In another example, the double-bit error detection feature may be omitted. In such a scenario, the data packet may contain a 32-bit word 732 and six parity bits 734, which leaves two additional bits. Those two additional bits may be used for different purposes. For example, bit 730 may indicate whether the 32-bit word is a data or a control word and bit 736 may indicate whether odd or even parity was checked.

A data packet may also have a total of 80 bits and contain a 64-bit word 742 and eight parity bits 746 to allow for single-bit error correction and double-bit error detection, leaving one bit 740 to indicate whether the word is a data or control word, and 7 additional bits which may be used for different purposes. The 64-bit word 752 requires only seven parity bits 756 for single-bit error correction in the event that the double-bit error detection feature is omitted, leaving 9 additional bits which may be used for different purposes. For example, the additional bits may be used to improve DC balance, to improve clock recovery upon reception, or to convey additional control words.

The arrangements of the different data packets in separate words, parity bits, and additional bits are merely illustrative. If desired, the order of the arrangement may be changed arbitrarily and parity bits or additional bits may be interleaved with each other and with the data bits.

Figure 8:
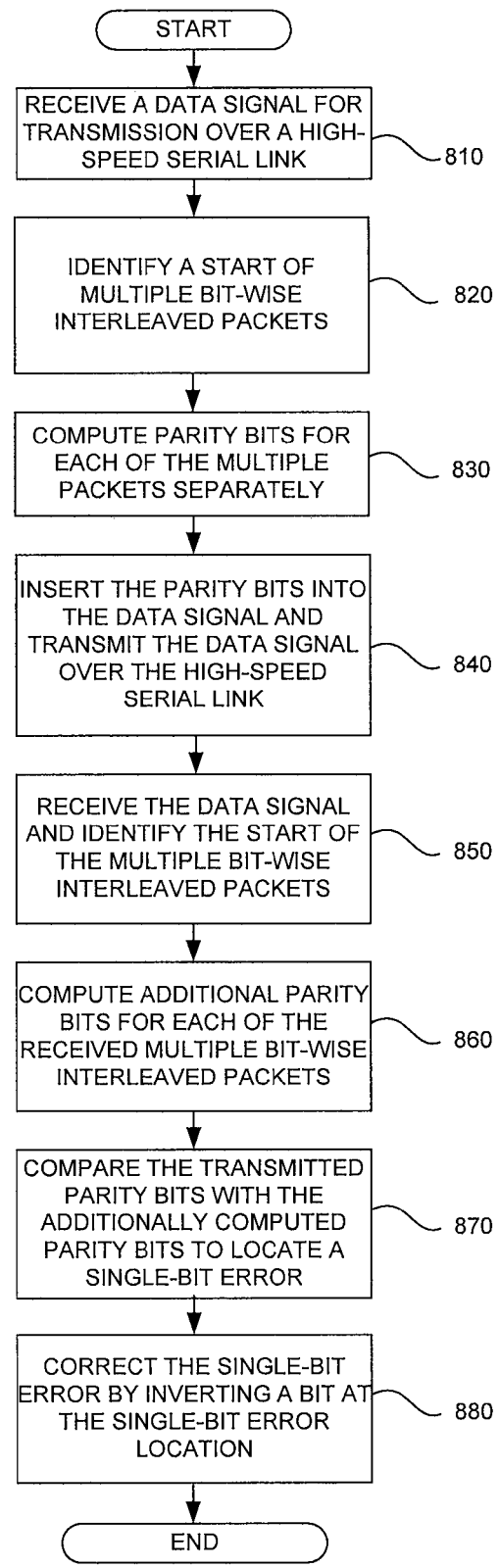
FIG. 8 is a flow chart of illustrative steps for detecting and correcting single-bit errors in communication over serial links in accordance with an embodiment of the present invention.

A flow chart of illustrative steps for detecting and correcting single-bit errors in communication over serial links is shown in FIG. 8. During step 810, a data signal having multiple data words may be received by an error correction encoder such as error correction encoder 310 in FIG. 3. The error correction encoder may identify a start of multiple bit-wise interleaved packets at step 820 and compute parity bits for each of the multiple packets during step 830.

During step 840, the parity bits may be inserted into the respective data packets and transmitted by a transmitter (e.g., transmitter 320 of FIG. 3) over a high-speed serial link (e.g., high-speed serial link 330 of FIG. 3) to a receiver (e.g., receiver 340 of FIG. 3).

The receiver may identify the start of the multiple interleaved packets during step 850. During step 860, an error location and correction circuit (e.g., error location and correction circuit 350 of FIG. 3) may compute additional parity bits for each of the received multiple bit-wise interleaved packets. The additionally computed parity bits may be compared with the transmitted parity bits during step 870 to locate a single-bit error in the received data packet. During step 880, the single-bit error in the received packet may be corrected by inverting the bit at the single-bit error location.

The method and apparatus described herein may be incorporated into any suitable integrated circuit or system of integrated circuits. For example, the method and apparatus may be incorporated into numerous types of devices such as microprocessors or other ICs. Exemplary ICs include programmable array logic (PAL), programmable logic arrays (PLAs), field programmable logic arrays (FPGAs), electrically programmable integrated circuits (EPLDs), electrically erasable programmable integrated circuits (EEPLDs), logic cell arrays (LCAs), field programmable gate arrays (FPGAs), application specific standard products (ASSPs), application specific integrated circuits (ASICs), just to name a few.

The integrated circuit described herein may be part of a data processing system that includes one or more of the following components; a processor; memory; I/O circuitry; and peripheral devices. The data processing system can be used in a wide variety of applications, such as computer networking, data networking, instrumentation, video processing, digital signal processing, or any suitable other application.

Although the method operations were described in a specific order, it should be understood that other operations may be performed in between described operations, described operations may be adjusted so that they occur at slightly different times or described operations may be distributed in a system which allows the occurrence of the processing operations at various intervals associated with the processing, as long as the processing of the overlay operations are performed in a desired way.

The foregoing is merely illustrative of the principles of this invention and various modifications can be made by those skilled in the art without departing from the scope and spirit of the invention. The foregoing embodiments may be implemented individually or in any combination.

What is claimed is:

1. Circuitry for reducing errors in a data signal received over a high-speed serial link, wherein the data signal includes multiple groups of bits, and wherein each group of bits includes data bits and parity bits, the circuitry comprising:
   an interface circuit that receives the data signal over the high-speed serial link;
   an error generating circuit that receives at least a first group of bits of the multiple groups of bits and that generates an error signal based at least in part on a value of at least one additional bit in the first group of bits that is selected between an odd parity bit and an even parity bit; and
   an error correction circuit that receives the data signal from the interface circuit and that uses the parity bits to locate and correct only single-bit errors in the data bits of each group of bits in the data signal.

2. The circuitry of claim 1 further comprising:
   a transmitter that is coupled to the high-speed serial link and that sends the data signal over the high-speed serial link to the interface circuit.

3. The circuitry of claim 1, wherein the error correction circuit further detects double-bit errors in each group of bits in the data signal.

4. The circuitry of claim 1, wherein the data signal that is received by the interface circuit includes multiple groups of bits that are bit-wise interleaved.

5. The circuitry of claim 1, wherein the error correction circuit further comprises:
   a parity generator circuit that receives a given group of bits in the data signal, wherein the parity generator circuit computes additional parity bits based on the data bits in the given group of bits; and
   a parity check circuit that receives the parity bits in the given group of bits and the additional parity bits computed from the parity generator circuit, wherein the parity check circuit compares the parity bits in the given group of bits with the additional parity bits and outputs a bit position for a detected single-bit error based on the comparison.

6. The circuitry of claim 5, wherein the error correction circuit further comprises:
correction circuitry that receives the bit position of the single-bit error from the parity check circuit and inverts data at the bit position.

7. Circuitry for encoding a data signal for transmission over a high-speed serial link, wherein the data signal is arranged in groups of bits, the circuitry comprising:
an encoding circuit that generates parity bits and inserts the parity bits into the data signal to enable single-bit error correction in each group of bits upon receipt of the data signal, wherein the encoding circuit includes first and second logic gates that receive respective first and second groups of bits of the data signal that differ in at least one bit, wherein the encoding circuit includes a selector circuit for selecting a value for at least a given bit of the data signal to distinguish between an even parity bit value and an odd parity bit value for each group of bits; and
a transmitter circuit that receives the data signal from the encoding circuit and transmits the data signal over the high-speed serial link.

8. The circuitry of claim 7 further comprising:
a receiver coupled to the high-speed serial link that receives the data signal transmitted over the high-speed serial link.

9. The circuitry of claim 7, wherein the encoding circuit further generates and adds an additional parity bit to each group of bits of the data signal to enable double-bit error detection in each group of bits.

10. The circuitry of claim 7, wherein the encoding circuit further comprises:
an interleaver circuit that receives the groups of bits with parity bits and that bit-wise interleaves a given number of subsequently received groups of bits with parity bits.

11. The circuitry of claim 7,
wherein the even parity bit is high only when a number of set bits in a respective group of bits is odd, and wherein the odd parity bit is low only when the number of set bits in a respective group of bits is odd.

12. The circuitry of claim 11, wherein the selector circuit further comprises:
a multiplexer that receives a control signal, the even parity bit, and the odd parity bit, wherein the multiplexer selects between a first signal value for the value of the given bit to indicate even parity and a second signal value for the value of the given bit to indicate odd parity based on the control signal.

13. The circuitry of claim 7, wherein the encoding circuit further generates additional groups of bits and inserts the generated additional groups of bits into the data signal, and wherein the additional groups of bits convey a command for a receiver of the data signal.

14. The circuitry of claim 13, wherein the command for the receiver of the data signal includes a comma symbol used for synchronization of data signals.

15. The circuitry of claim 13, wherein the encoding circuit further inserts an additional bit into each group of bits and each additional group of bits, and wherein the additional bit has a different value for the additional groups of bits and for the groups of bits.

16. A method for transmitting a serial data signal that comprises bits each having a value selected from a logic low value and a logic high value, the method comprising:
identifying a start of a plurality of packets in the data signal, wherein the packets are bit-wise interleaved;
computing a set of parity bits for each of the plurality of bit-wise interleaved packets;
computing an additional parity bit for a first packet of the plurality of packets by selecting between an odd parity bit and an even parity bit based on an amount of logic low bits in a subset of the data signal;
inserting the sets of parity bits into the data signal; and
transmitting the data signal over a serial communications link.

17. The method of claim 16 further comprising:
with a receiver circuit, receiving the data signal transmitted over the serial communications link;
identifying the start of the plurality of packets, wherein the packets are bit-wise interleaved; and
computing an additional set of parity bits for the plurality of bit-wise interleaved packets.

18. The method of claim 17 further comprising:
for the plurality of bit-wise interleaved packets, comparing the additional set of parity bits with the set of parity bits in the data signal to locate a single-bit error; and
in response to locating the single-bit error, correcting the single-bit error by inverting data at the single-bit error location.

19. A method for receiving a serial data signal comprising:
identifying a start of a plurality of packets in the received data signal, wherein the packets are bit-wise interleaved;
identifying a first set of parity bits for each of the plurality of bit-wise interleaved packets in the received data signal;
identifying an additional parity bit that indicates a parity selected from an odd parity and even parity;
computing a second set of parity bits for each of the plurality of bit-wise interleaved packets; and
for the plurality of bit-wise interleaved packets, comparing the additional set of parity bits with the set of parity bits in the data signal to locate a single-bit error.

20. The method of claim 19 further comprising:
in response to locating the single-bit error, correcting the single-bit error by inverting data at the single-bit error location.

* * * * *